Jan. 10, 1956 N. E. PEERY 2,730,239
CONTINUOUS FLUID-SOLID CONTACTING APPARATUS
Filed March 22, 1952 3 Sheets-Sheet 1
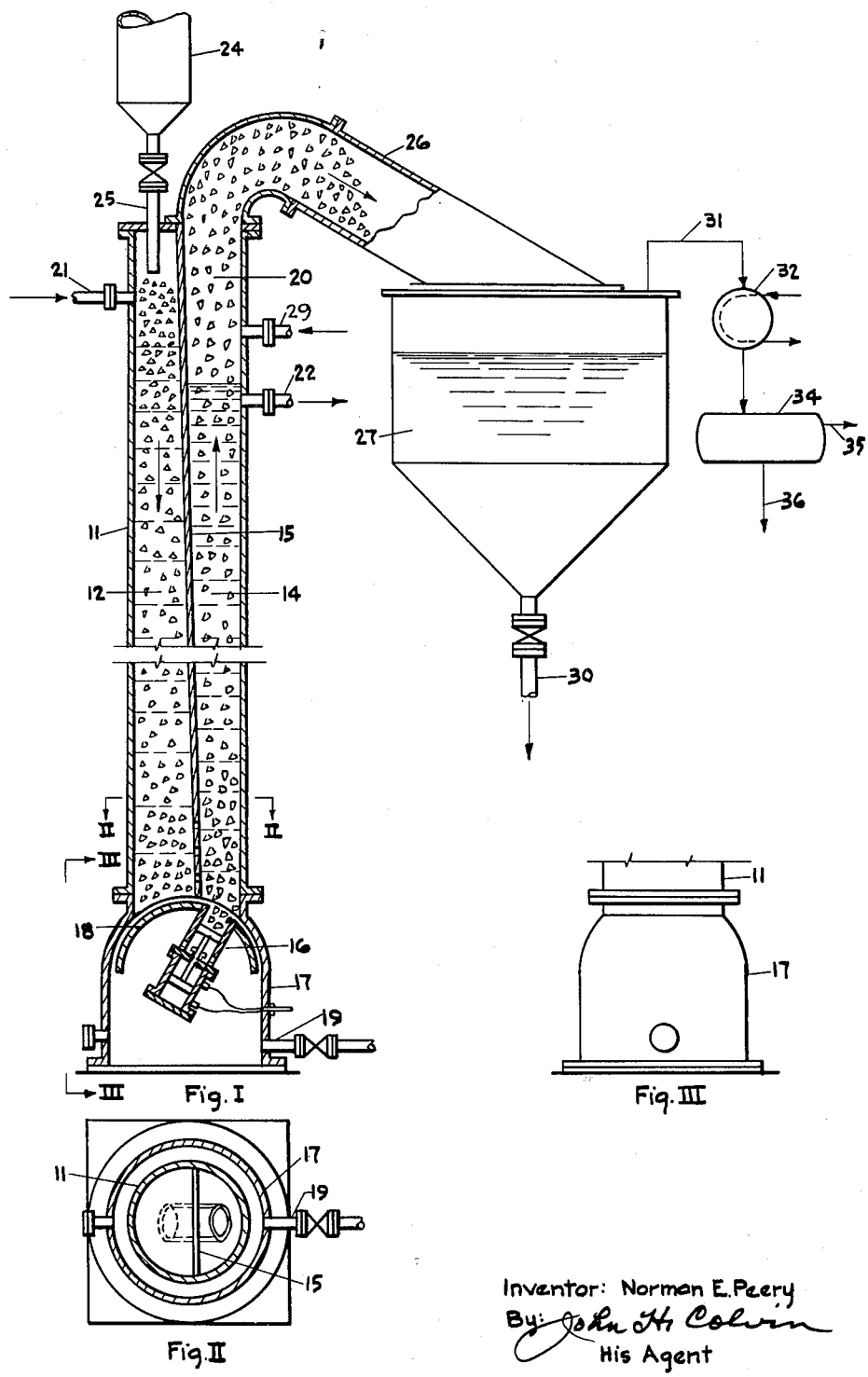
Fig. I
Fig. II
Fig. III
Inventor: Norman E. Peery
By: John H. Colvin
His Agent

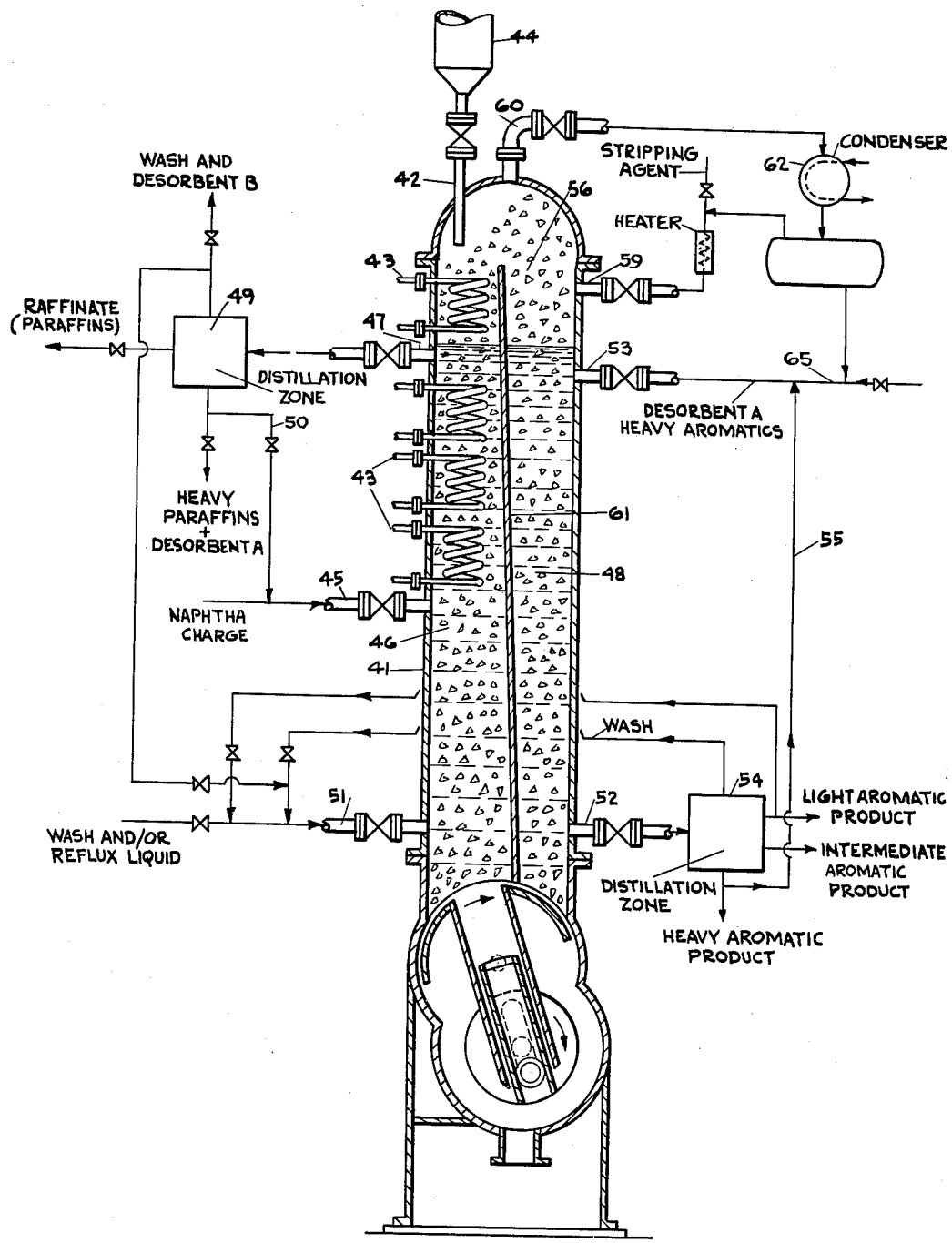
Fig. IV

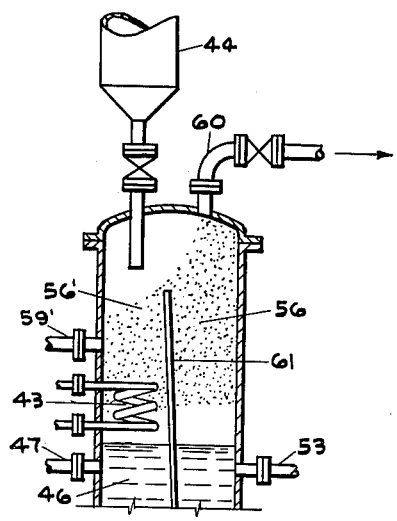
Fig. V
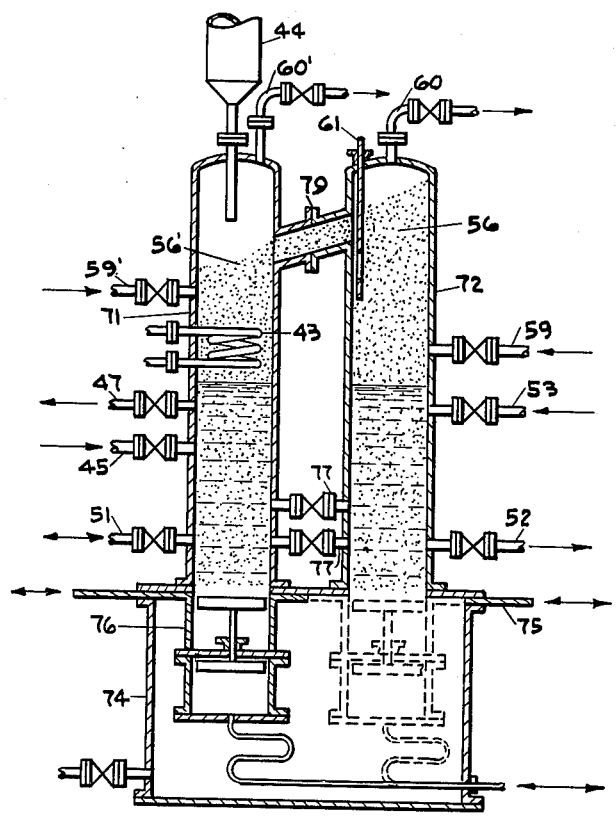
Fig. VI
Inventor: Norman E. Peery
By: John H. Colvin
His Agent

United States Patent Office 2,730,239
Patented Jan. 10, 1956

2,730,239

CONTINUOUS FLUID-SOLID CONTACTING APPARATUS

Norman E. Peery, San Francisco, Calif., assignor to Shell Development Company, Emeryville, Calif., a corporation of Delaware Application March 22, 1952, Serial No. 278,096

6 Claims. (Cl. 210—42.5)

This invention relates to a method and apparatus for continuously contacting a solid with a fluid. More particularly, it relates to a method and apparatus for continuously contacting a fluid stream, and especially a liquid stream, with a moving body of solid particulate material.

The invention relates to an improved method and apparatus for removing impurities from particulate solids by continuous contacting with a washing fluid medium. It also relates to an improved method for removing dissolved or suspended material from a fluid stream by continuous contacting with a movable body of particulate solid material.

Various methods have been proposed, on the one hand, for the treatment of fluid mixtures with solid adsorbent material such as activated carbon, activated alumina, silica gel, bone char, ion exchange resins, and the like, for the removal of a component from the fluid. Thus, in the "hypersorption" process a gaseous mixture, such as a mixture of lower molecular weight hydrocarbons which may also contain hydrogen, is countercurrently contacted with a gravitating body of particulate solid adsorbent for selective adsorption and recovery of one or more selected components of the gaseous mixture. According to the Claussen et al. Patent U. S. 2,470,339, a liquid mixture is continuously fractionated by selective adsorption utilizing a gravitating columnar mass of particulate adsorbent material. The Olsen Patent U. S. 2,564,717 accomplishes a similar purpose by utilizing an upwardly moving bed of solid particulate adsorbent.

It is well known to dry moist gases and non-aqueous liquids by passing them as streams through a stationary bed of solid dessicant; various oils are purified or otherwise treated by passing them through fixed masses of solid adsorbent, as in the clay contacting treatment of mineral lubricating oils, of gasoline, and the like.

On the other hand, it is known to treat a solid material in particulate form with a fluid for the purpose of removing, as by extracting, one or more components of the solid mass, such as the washing of silica gel to remove alkali metal salts or the extraction of oil from comminuted or crushed oilseeds, or the hot-gas drying of a wet granular material.

The use of a moving mass of the solid material in solid-fluid contacting processes has various advantages over the use of a fixed bed of the solid, such as flexibility, ease of regeneration of the spent adsorbent, uniformity of operation, continuity of operation, and the like. Two general types of such operations are used. In one case a finely divided solid material is maintained in a so-called fluidized state wherein there is rather uniform mixing of the solid particles. In the other case the solid material, whether finely divided or of a larger granular form, is moved much as a columnar mass without fluidization through an elongated contacting zone. The latter type of operation has the advantage over the former of making it possible to effect a selective fractionation in its application, similar to that of a selective solvent extraction in a countercurrent solvent extraction process wherein concentration gradients of the different transferable components are established and utilized to produce a more efficient separation between various transferable components.

Various means have been proposed to effect the desired movement of the solid particles, such as the use of gravity and bucket elevators (U. S. 2,470,339) and the use of a screw conveyor coupled with liquid-buoyancy and gravity (U. S. 2,564,717).

It is a principal object of this invention to provide an improved method and apparatus for contacting a particulate solid material with a fluid. Another object is to provide an improved method for countercurrently contacting a fluid stream with a moving columnar mass of a particulate solid. A further object is to provide an improved method for separating a liquid mixture of similarly boiling hydrocarbons of different adsorbabilities by a solid adsorbent. Other specific objects are to provide an improved method and apparatus for drying a wet particulate solid material by contacting with a suitable drying gas; for drying a wet gas by contacting with a particulate solid drying agent; for separating suspended finely divided solids from a gas or a liquid stream by contacting with a moving bed of particulate solid material. Other objects will become apparent and the objects will be better understood from the following description of the invention, which will be made with reference to the accompanying drawing, in which the same numerals in different figures refer to like parts and, wherein:

Fig. I is a view, partly in section, of an apparatus embodying, and useful in the practice of, the invention;

Fig. II is a section along II—II of Fig. I;

Fig. III is a sectional view of the lower segment of the apparatus of Fig. I, taken at right angles to Fig. I;

Fig. IV is a view, partly in section and partly schematic, of another apparatus embodying and useful in the practice of the invention;

Fig. V is a fragmentary view, partly in section and partly elevational, of a modification of the upper portion of the apparatus shown in Fig. IV, and Fig. VI is a diagrammatic sketch of a still further embodiment of the invention.

In accordance with the present invention, there is provided a method and an apparatus wherein a particulate solid material is caused to move substantially continuously downwardly as a columnar mass through a first upright elongated zone, the solid is transferred incrementally from the lower end of said first zone to the lower end of a second upright elongated zone substantially contiguous to the first zone, the solid material is forced substantially continuously upwardly through said second zone as a columnar mass, and a fluid is substantially continuously contacted as a stream thereof with said moving solid material concurrently or countercurrently thereto, at a fluid flow rate independent of the rate of movement of the solid. When the solid is to be recycled, the second zone is advantageously made longer than the first zone and the solid material can be returned from the top of the second zone by gravity directly to the top of the first zone. The contacted solid is readily treated, when desired, in an upper portion of the second zone for the removal therefrom of material adsorbed thereon from the fluid being treated, as by a displacing or stripping agent, after which the stripped solid can be returned for re-use in the first zone, or a second stripping or displacing agent can be used to remove, at least partially, a first displacing agent.

Referring ot Fig. I, the numeral 11 designates an upright elongated cylindrical vessel of height several-fold the diameter, divided into two contiguous upright zones 12 and 14, by a vertically positioned substantially diametrical partition 15, which is displaced slightly from the vertical so that the cross-sectional area of zone 12 increases progressively toward the lower end thereof and that of zone 14 increases toward the upper end thereof, thus facilitating the movement of solid particles from the top to the bottom of zone 12 and from the bottom to the top of zone 14. The partition 15 is provided at the lower end thereof with openings therethrough thus providing independent fluid communication between the two zones. Alternatively, external communicating means can be provided. Furthermore, additional inlet and outlet means can be provided at the lower ends of the two zones so that two separate fluids can be contacted with the solid in the two zones.

The lower end of vessel 11 is provided with a valved solids-transferring mechanism 16 comprising a cylinder and piston combination which is oscillatable about its transverse axis and adapted to be alternately placed in direct communication with the lower end of each of the two zones and in coordination therewith to move the piston thereof in reciprocation as by an off-center movement of a suitable actuating mechanism so as to withdraw solid material from the first zone when the cylinder is in communication therewith and then to force said withdrawn solid into the second zone when the piston-cylinder has been moved into communication therewith. The solids-transferring mechanism is suitably contained in a housing 17 which is advantageously partially filled with a suitable immiscible liquid of higher density than the fluid to be contacted, in order to avoid a dead body of partially treated product at this point. Various valved solids-transfer arrangements can be utilized, as will be readily understood. Thus the oscillation of the unit from communication with one zone to the other can be effected by a suitable rocker-arm mechanism arranged to provide any desired delay periods at the ends of the motion. Similarly, the reciprocating motion of the piston can be effected to coordinate with the oscillating motion of the unit, the piston suitably being operated by hydraulic power, or by a suitably arranged pin and slot mechanism driven from a suitable power shaft.

The upper part of the housing 17 is suitably cylindrical about a horizontal axis at the center of oscillation of the piston-cylinder unit, with the sliding valve member 18 also being a longitudinal section of a cylinder of the same curvature but of slightly less radius, and adapted to serve at least in part as support for a part of the solids and as sliding valve closure member. The sliding surface of this valve member is suitably imperforate. However, it can be of any suitable material which will serve as an adequate support and retainer for the solid particles. Thus, it can be a perforate member with the openings therethrough being sufficiently small to prevent passage of the solid material, except the passage of relatively small amounts of solid fines which may be collected in the lower part of the housing and removed as required.

The vessel 11 is provided with suitable fluid inlet and outlet means 21 and 22 adapted for concurrent or countercurrent passage of fluid into and out of the two contacting zones. The first zone is also provided with a solids inlet, such as a bin 24 and valved line 25. The second zone is extended at the upper end thereof into a descending chute 26 which is connected to a collecting vessel 27. The upper upright portion of the second zone is suitably provided with a second fluid inlet or outlet opening 29, above the opening 22, for use as desired, such as to inject a stripping agent into the upwardly moving column of solid particles so as to strip therefrom components removed from the fluid stream being contacted with the solid particles in the principal contacting zones. Collecting vessel 27 is provided with a suitable discharge line 30 for withdrawing the solid particles together with any condensed stripping agent and with an overhead line 31 provided with a suitable condenser 32 and collecting vessel 34. Vessel 34 is provided with suitable drawoff lines 35 and 36 which may be liquid level-controlled if desired.

In the apparatus illustrated in Fig. I, the comminuted solid to be contacted is passed substantially continuously down through the left leg of the apparatus and up through the right leg. The desired movement of the solid is effected by the ram arrangement located at the bottom. For concurrent contacting, the liquid to be contacted with the solid flows concurrently with the solid. Thus, the feed liquid is introduced by line 21 near the top of the left leg. It is passed downwardly through the column, through the perforations in the partition near the bottom, up through the right-hand column, and then is finally withdrawn at its upper level near the top of the right-hand column. Since the liquid flows through the orifices or openings near the bottom of the partition, the rates of liquid flow and of solid flow are independently controlled.

By altering the positions of the liquid inlet and outlet lines the liquid can be caused to flow countercurrently to the solid. This is particularly desirable in many operations, such as in the drying of a wet gas stream by contacting it with a granular solid drying agent.

An advantageous feature of the method and apparatus is that the solid, after being contacted with a liquid, can be raised above the liquid level, as in the upper portion 20 of zone 14, to a position where it can drain and can be advantageously stripped by steam or any other stripping gas. While upflow of the stripping gas is indicated it is, of course, obvious that the stripping gas could also be introduced at a higher point in the stripping zone and be withdrawn substantially at the liquid level. Stripping or treating with a lighter immiscible liquid instead of a gas is also possible.

A particularly useful application of the apparatus of Fig. I, particularly wherein the valve-closing member 18 is perforate and permits the passage of aqueous solutions, is in the breaking of oil-water emulsions, such as crude oil-salt water emulsions. For this purpose, the granular solid material, for example granular coke, is countercurrently contacted with the oil-water mixture, as by introducing the oil-water emulsion in the right-hand column by line 22. Substantial phase separation is effected in the right column and a portion of the liquid mixture is allowed to pass through the perforate valve member 18 into the housing 17, wherein stratification occurs. The lower aqueous phase is withdrawn through valved line 19, the flow of which therethrough can be controlled by means of a liquid level control made responsive to change in the aqueous phase liquid level in the housing 17. The remainder of the oil-water mixture is withdrawn by line 21, after passage through the granular solid in the left column, and run to a settler for phase separation. In this application the absolute rate of movement of the solid material can be quite small. However, it has the advantage of making it possible to provide new initial contacting surface in a continuous manner, thereby avoiding reduced flow rates due to plugging of the initially contacted layer of solid by finely dispersed solids carried in suspension in the oil-water mixture. In a similar manner, the apparatus and method are useful for the filtration of suspended solid matter from both gaseous and liquid streams.

Fig. IV illustrates a second embodiment of the invention, wherein the solid-liquid contactor is shown in vertical cross-section. For a better understanding of the invention, the use of the apparatus shown in Fig. IV will be described in connection with the adsorption separation of a light reformed naphtha charge stock boiling in the range corresponding to $C_6$–$C_8$ hydrocarbons, and comprising essentially paraffinic and aromatic hydrocarbons.

The contactor 41 which comprises upright contacting zones 46 and 48 is initially charged with a suitable adsorbent, preferably silica gel, as by means of a suitably valved line 42 connected to a storage vessel 44. The contacting zones 46 and 48 are separated by a partition 61, and zone 46 is provided with suitable cooling coils 43. In operation, the naphtha charge is fed by line 45 into an intermediate section of the left hand contacting zone 46. As the charge liquid flows upwardly in zone 46 the aromatic components are selectively adsorbed by the adsorbent while the paraffinic components remain in unadsorbed liquid phase and are withdrawn through line 47, together with desorbed desorbent A, as well as any light paraffinic wash liquid or desorbent B. They are readily separated for the most part by distillation in distillation zone 49, a portion of the heaviest fraction containing an amount of heavy paraffins corresponding to the feed content thereof being withdrawn from the system while the remainder is returned to the adsorption zone via lines 50 and 45 for the recovery of the desorbent A content thereof. As the adsorbent in adsorption zone 46 moves downwardly, the selective separation between aromatic and paraffinic components of the charge stock is further improved by means of a lighter paraffinic hydrocarbon wash (desorbent B), such as liquefied butane, which completes the rejection of the charge stock paraffins up the column, or by means of a light aromatic hydrocarbon (benzene) reflux, or both, either or both such liquids being introduced to the bottom of the column as by a line 51. The adsorbent containing the aromatic hydrocarbons of the charge stock as adsorbate and any occluded liquid phase hydrocarbons consisting for the most part of aromatic hydrocarbons and only wash paraffinic hydrocarbons, is transferred incrementally and substantially continuously by means of the solids-transfer and ram mechanism, to the right-hand column wherein it is contacted countercurrently in zone 48 with a suitable liquid desorbent A, such as a suitable stream of heavy aromatics (xylenes) accumulated from and recycled in the system. The desorbent A is introduced by line 53 to an elevated position in the column and as it flows downwardly it displaces the adsorbed aromatics, which are withdrawn, as an extract together with some of the added desorbent A and any wash liquid or desorbent B, through line 52. The extract mixture is readily separated in distillation zone 54 to recover any wash liquid or desorbent B, which is returned to line 51, and to fractionate the aromatics into a light product (benzene) stream, a portion of which can be recycled as reflux to the bottom of the left-hand column, an intermediate product (toluene) stream and a heavy aromatic product (xylenes) stream, a portion of which can be delivered by line 55 to the desorbent A-line 53. The streams are controlled so as to maintain a liquid level of desorbent A slightly above the entry level of line 53.

By the desorption in zone 48, the adsorbent is effectively freed from all hydrocarbons except desorbent A. The adsorbent containing desorbent A as adsorbate is then concurrently contacted in stripping zone 56 with a suitable vaporized stripping agent, such as butane vapors, which may be heated if desired in heater 57 and delivered to zone 56 via line 59. The stripping agent vapors containing vaporized desorbent A are removed through a suitable line 60, with the stripped adsorbent being lifted above the partition 61 and allowed to fall by gravity into the top of the contacting zone 46. The stripping agent and desorbent A in line 60 are at least partially cooled in condenser 62, to condense desorbent A, and collected in storage vessel 64. Collected desorbent A is recycled to the desorption zone 48 via lines 65 and 53, while the stripping agent is recycled for use in the stripping zone 56.

Any required cooling of the adsorbent and the system in contacting zone 46 is provided by cooling coils 43. In general, the principal cooling required is in the uppermost part of the zone. Any of the stripping agent such as butane which is adsorbed on the adsorbent as it is transferred from stripping zone 56 to zone 46 is displaced and withdrawn through line 47.

A suitable modification of the apparatus and method described with reference to Fig. IV is indicated by Fig. V, wherein like numerals designate equivalent structures as in Fig. IV. Thus, instead of stripping the adsorbent in the upper section of the upwardly moving body of adsorbent by concurrent contact with the stripping agent or desorbent B, the adsorbent wet with desorbent A is permitted to drain in zone 56 and then, after passing over the barrier 61 to the upper part of zone 46, designated 56', it is countercurrently contacted therein with vaporized stripping agent. The unadsorbed stripping agent and desorbed and vaporized desorbent B are withdrawn through line 60 while the adsorbent is cooled, if necessary, as it gravitates past the upper cooling coil 43.

Various modifications of the apparatus and method can be made within the scope of the invention, some of which are indicated diagrammatically in Fig. VI. Thus, it will be readily understood that the two upright contacting zones can be provided in different shapes and sizes. Instead of two substantially hemicylindrical vessels as represented in Figs. I and IV, the two columns may be rectangular in cross section. Furthermore, they may be of substantially different cross-sectional areas while being of the same or different heights. The use of two columns of different cross-sectional areas is advantageous when it is desired to have substantially different contacting times in the different zones and yet utilize columns of solid of the same height. Whereas it is advantageous to provide the two columns in a single vessel by means of a vertical partition forming a wall which is common to both columns, the two columns can be further separated as long as they are substantially contiguous. Insulating means may be provided between the separated columns, as desired.

Fig. VI illustrates an embodiment of the invention wherein the two upright substantially contiguous contacting zones are cylindrical, as designated by numerals 71 and 72 and the solids transfer device comprises a lower housing 74 provided with a sliding valve member 75 adapted to be alternately positioned to provide an opening and a closure for the lower ends of the cylindrical contacting zones. The valve member is provided with a variable-volume, hydraulically operable, piston and cylinder assembly 76 secured to the sliding valve member with the communicating opening of the cylinder being the opening of the valve member. The cylindrical contacting chambers 71 and 72 are provided with valved communicating means 77 at the lower ends thereof and a sloping communicating and solids-transfer line 79 near the top, adapted for gravity transfer of solid particulate material from the top of cylindrical vessel 72 to vessel 71. Transfer line 79 can be provided with a suitable valve such as a sliding valve 61 in vessel 72. When it is desired to strip desorbent A from the adsorbent in zone 56, and to minimize transfer of stripped desorbent A into zone 56', valve 61 can be closed and opened intermittently, in coordination with an intermittent stripping operation in zone 56.

The column containing the descending solids can be provided as desired with cooling or heating coils, but the zone should be left sufficiently free from obstructions to permit the free downward movement of the particulate solid material. The column of ascending solids should be substantially unobstructed.

I claim as my invention:

1. An apparatus for continuously contacting a fluid stream with a non-turbulent moving body of particulate solid material comprising in combination two substantially upright elongated substantially adjacent vessels of substantially equal lengths adapted for substantially unobstructed movement of a mass of particulate solid material therethrough downwardly through the first of said vessels and upwardly through the second of said vessels, an oscillatable cylinder-piston valve assembly secured in spaced relation to the lower end closures of said vessels and adapted to be oscillated between alternating communication with said vessels and adapted for reciprocation of the piston thereof alternatingly to withdraw particulate solid material from the lower end of the first of the two vessels and to force the thus withdrawn particulate material into the lower end of the second of the two vessels, whereby the particulate solid material is caused to move downwardly from the upper end of the first vessel and thence upwardly by force of solid-to-solid contact between the particles to the upper end of the second vessel, fluid communicating means provided in said vessels adapted to permit the flow of fluid through each of said vessels in intimate contact with particulate solid material therein and substantially unobstructed communicating means between the upper ends of the vessels for the free transport by gravity of particulate solid from the second to the first vessel.

2. An apparatus according to claim 1, wherein one of the two vessels is provided with particulate solids material feed inlet means at the upper end thereof and the other one of the two vessels is provided with particulate solids material discharge means at the upper end thereof.

3. An apparatus according to claim 1, wherein the two vessels are provided with fluid communicating means therebetween at the lower ends thereof separate from the particulate solids transferring means.

4. An apparatus according to claim 1, wherein the cross-sectional area of each of the two vessels increases progressively and uniformly downwardly in the first of said vessels and upwardly in the second of said vessels, substantially throughout the lengths thereof.

5. An apparatus for continuously contacting a fluid stream with a moving body of particulate solid material comprising in combination an upright elongated cylindrical vessel closed at its lower end and provided with a substantially vertical partition extending substantially throughout the length of the cylinder and dividing it into two upright contiguous elongated vessels, the partition being perforate at the lower end thereof to provide fluid communication between the two contiguous vessels, a fluid inlet and a fluid outlet being provided near the top of each of the contiguous vessels, respectively, an oscillatable cylinder-piston valve assembly secured in spaced relation to the lower end closure and adapted to be oscillated between alternating communication with the two contiguous vessels and adapted for reciprocation of the piston thereof in coordination with the oscillation of the assembly to withdraw material from one of the contiguous vessels and deliver said material to the other one of the contiguous vessels, and means provided for transferring solids from the uppermost part of one of said contiguous vessels directly to the uppermost part of the other one.

6. An apparatus according to claim 5 wherein the substantially vertical partition is displaced from the vertical whereby the cross-sectional area of the contiguous vessels increases progressively and uniformly downwardly in the one of said contiguous vessels which is adapted for downward movement of the particulate solid and upwardly in the other of said contiguous vessels.

References Cited in the file of this patent

UNITED STATES PATENTS

| | | |
|---|---|---|
| 1,671,864 | Higgins | May 29, 1928 |
| 1,678,298 | Patrick et al. | July 24, 1928 |
| 2,183,837 | Hamilton et al. | Dec. 19, 1939 |
| 2,356,890 | Schulze | Aug. 29, 1944 |
| 2,384,311 | Kearby | Sept. 4, 1945 |
| 2,441,572 | Hirschler et al. | May 18, 1948 |
| 2,470,339 | Claussen et al. | May 17, 1949 |
| 2,501,153 | Berg | Mar. 21, 1950 |
| 2,552,435 | Knox et al. | May 8, 1951 |
| 2,564,717 | Olsen | Aug. 21, 1951 |
| 2,596,942 | Robertson et al. | May 13, 1952 |
| 2,640,019 | Berg | May 26, 1953 |
| 2,646,451 | Rommell | July 21, 1953 |

FOREIGN PATENTS

| | | |
|---|---|---|
| 341,581 | Great Britain | Jan. 22, 1931 |

OTHER REFERENCES

Ser. No. 255,849, Suss (A. P. C.), published June 1, 1943.